United States Patent [19]

Wada et al.

[11] Patent Number: 5,334,457
[45] Date of Patent: Aug. 2, 1994

[54] PLASTIC FILM HAVING A COATING LAYER COMPRISING A COPOLYESTER AND A CONDUCTIVE POLYMER AND LIGHT-SENSITIVE PHOTOGRAPHIC MATERIAL USING THE SAME

[75] Inventors: Yoshihiro Wada; Tohru Kobayashi; Noriki Tachibana, all of Hino, Japan

[73] Assignee: Konica Corporation, Tokyo, Japan

[21] Appl. No.: 757,247

[22] Filed: Sep. 10, 1991

[30] Foreign Application Priority Data

Sep. 12, 1990 [JP] Japan .................. 2-241964
Sep. 21, 1990 [JP] Japan .................. 2-253884

[51] Int. Cl.$^5$ ............................. B32B 27/06
[52] U.S. Cl. .................... 428/480; 428/482; 430/529; 430/533; 430/908; 430/927
[58] Field of Search ............ 428/480, 482; 430/529, 430/533, 908, 927

[56] References Cited

U.S. PATENT DOCUMENTS

| | | | |
|---|---|---|---|
| 4,225,665 | 9/1980 | Schadt, III | 430/529 |
| 4,478,907 | 10/1984 | Van Gossum et al. | 428/327 |
| 4,701,403 | 10/1987 | Miller | 430/529 |
| 4,908,277 | 3/1990 | Tsunashima et al. | 428/480 |
| 4,935,338 | 6/1990 | Masuda et al. | 430/631 |
| 4,978,740 | 12/1990 | Kawamoto et al. | 528/272 |
| 5,079,136 | 1/1992 | Tachibana et al. | 430/529 |
| 5,084,339 | 1/1992 | Tachibana et al. | 428/327 |
| 5,098,822 | 3/1992 | Tachibana et al. | 430/527 |

FOREIGN PATENT DOCUMENTS

| | | |
|---|---|---|
| 0078559 | 5/1983 | European Pat. Off. . |
| 0191302 | 8/1986 | European Pat. Off. . |
| 0376693 | 7/1990 | European Pat. Off. . |
| 152530 | 9/1982 | Japan . |

OTHER PUBLICATIONS

World Patents Index Latest, Derwent Publications Ltd., London, Great Britain, AN 82-91740E (43) for JP-A-57-152 530.

Primary Examiner—Paul J. Thibodeau
Assistant Examiner—H. Thi Le
Attorney, Agent, or Firm—Frishauf, Holtz, Goodman & Woodward

[57] ABSTRACT

There are disclosed a plastic resin film which comprises a polyester resin composition comprising at least two components of (A) a polyester copolymer and (B) a polymer having conductivity, preferably having a number average molecular weight of 500 to 5000, being laminated on at least one surface of a plastic film support; a light-sensitive photographic material which comprises at least one silver halide emulsion layer being laminated on said film laminate or plastic film; and a method for preparing a plastic film which comprises coating an aqueous solution of the polyester resin composition on at least one surface of a non-oriented plastic film support or uniaxially oriented plastic film support, stretching the coated support to at least monoaxial direction and then completing orientation crystallization.

16 Claims, No Drawings

PLASTIC FILM HAVING A COATING LAYER COMPRISING A COPOLYESTER AND A CONDUCTIVE POLYMER AND LIGHT-SENSITIVE PHOTOGRAPHIC MATERIAL USING THE SAME

BACKGROUND OF THE INVENTION

This invention relates to plastic film excellent in antistatic property and adhesive property as well as excellent in transparency, a process for preparing the same and a light-sensitive photographic material using said film.

A polyester film, particularly polyethylene terephthalate biaxially oriented film has been used as a base for photographic film, a base for drawing and a base for magnetic recording tape due to its transparency, dimensional stability and excellent mechanical properties. In these uses, a subbing layer has been usually provided between a polyester support and a surface material whereby adhesiveness between the support and the material has been improved.

On the other hand, for improvement in adhesiveness between a linear polyester and a metal foil, various plastics, particularly a hydrophilic resin such as gelatin, there has heretofore been proposed to use a water-soluble or water-dispersible polyester copolymer as a subbing layer on the merits of working atmosphere such as less toxicity and non-inflammability, and unnecessariness of explosion-proof facilities.

As an example thereof, for example, in Japanese Patent Publication No. 40873/1972, there has been described a copolymer using 8 mole % or more of an ester forming sulfonic acid metal base-containing compound based on a total acid component and 20 mole % or more of polyethylene glycol based on a total glycol component for the purpose of dispersing the polymer in water. However, when the copolymer is used as a subbing layer, it can be easily expected that water resistance of said subbing layer, i.e. water resistance of adhesion is lowered.

Also, in Japanese Patent Publication No. 5476/1981, a saturated linear aliphatic dicarboxylic acid having 4 to 8 methylene groups has been used for the purpose of improving adhesiveness. In this case, however, it cannot be said that water resistance of a subbing layer is sufficient. Further, in Japanese Provisional Patent Publication No. 88454/1981, a substantially water-insoluble aqueous dispersion has been used in order to improve water resistance, but a water-soluble organic solvent is contained in a dispersion so that there remains in the problem of working atmosphere. In Japanese Provisional Patent Publication No. 248231/1985, substantially the same material as in the aforesaid Japanese Provisional Patent Publication No. 88454/1981 has been disclosed, but the material is different therefrom mainly in the point of containing no organic solvent in the final aqueous dispersion. However, an organic solvent has been used in the course of preparing the aqueous dispersion so that it is not practically preferred in the points that, in addition to the problem of working atmosphere, preparation processes of the aqueous dispersion become complicated.

Also, in such a prior art, it is difficult to provide excellent transparency and antistatic property to a subbing layer simultaneously. In Japanese Provisional Patent Publication No. 164831/1986, a technique of providing a subbing layer which is transparent, has transparency and satisfies adhesiveness has been disclosed. However, a polyester copolymer to be used therein is substantially water-insoluble and yet the polyester copolymer is prepared as an aqueous dispersion after once dissolved in a water-soluble organic solvent, and then used for a subbing layer coating solution. Thus, the resulting subbing layer is inferior in adhesiveness to a hydrophilic colloid layer whereas it is excellent in water resistance. Further, for using the polyester copolymer as an aqueous dispersion, a water-soluble organic solvent is necessarily contained therein so that a problem of working atmosphere remains, and other various problems are involved that measures to explosion proof of an elongation device and environmental pollution should have been taken.

SUMMARY OF THE INVENTION

The present invention has been done in order to solve the above problems. The present inventors have intensively studied in order to provide a subbing layer having transparency, antistatic property and adhesiveness with ease simultaneously without using any organic solvent and with completely aqueous system, and as the results, they have accomplished the present invention.

That is, a first object of the present invention is to provide a plastic film in which a polyester resin composition is laminated on a plastic film support. The plastic film is excellent in coating property as an aqueous solution and has good adhesiveness to a polyester support, is transparent and has antistatic property.

A second object of the present invention is to provide a plastic film having excellent adhesiveness to a hydrophilic colloid such as polyvinyl alcohol and gelatin, particularly in humid conditions, and also having good transparency.

A third object of the present invention is to enable coating of a coating solution containing a polyester resin composition with a completely aqueous system whereby solving the problems on working atmosphere and environmental pollution and enabling simplification of facilities.

A fourth object of the present invention is to provide a light-sensitive photographic material in which a silver halide emulsion layer(s) is/are provided on the plastic film, which is excellent in adhesiveness between layers.

Another object of the present invention is to provide a plastic film showing good adhesiveness to a magnetic layer containing a binder.

The above objects of the present invention can be accomplished by a plastic film which comprises a polyester resin composition comprising at least two components of (A) a polyester copolymer and (B) a polymer having conductivity, preferably with a number average molecular weight of 500 to 5000, being laminated on at least one surface of a plastic film support, and a light-sensitive photographic material in which at least one silver halide emulsion layer is laminated on said film laminate or plastic film.

Also, the method for preparing a plastic film comprises coating an aqueous solution of a polyester resin composition on at least one surface of a non-oriented plastic resin film support or uniaxially oriented plastic resin film support, stretching the coated support to at least monoaxial direction and then completing orientation crystallization.

DESCRIPTION OF THE PREFERRED EMBODIMENTS

In the following, the present invention will be explained in more detail.

In the present invention, a layer containing a polyester resin is laminated on at least one surface of a plastic film support as a subbing layer. This polyester resin comprises at least two components of (A) a polyester copolymer and (B) a polymer having conductivity.

The above polyester copolymer constituting the polyester resin composition of the present invention can be obtained by, for example, the reaction of mixed dicarboxylic acid components and a glycol component.

The above mixed dicarboxylic acid components are a dicarboxylic acid component containing 5 to 25 mole % of a dicarboxylic acid component having sulfonate group (a dicarboxylic acid having sulfonate group and/or an ester forming derivative thereof) based on the total dicarboxylic acid components in a water-soluble polyester copolymer.

As the dicarboxylic acid component having sulfonate group and/or the ester forming derivative thereof to be used in the present invention, those having a group of sulfonic acid alkali metal salt are particularly preferred, and there may be mentioned, for example, an alkali metal salt of 4-sulfoisophthalic acid, 5-sulfoisophthalic acid, sulfoterephthalic acid, 4-sulfophthalic acid, 4-sulfonaphthalene-2,7-dicarboxylic acid and 5-(4-sulfophenoxy) isophthalic acid or its ester forming derivatives. Of these, sodium 5-sulfoisophthalate or its ester forming derivatives are particularly preferred. These dicarboxylic acid and/or the ester forming derivatives thereof having sulfonate group are particularly preferred to use in an amount 6 to 10 mole % based on the total dicarboxylic acid component in view of water-solubility and water resistance.

As the other dicarboxylic acid component, there may be mentioned an aromatic dicarboxylic acid component (aromatic dicarboxylic acid and/or its ester forming derivative), alicyclic dicarboxylic acid component (alicyclic dicarboxylic acid and/or its ester forming derivative) and aliphatic dicarboxylic acid component (aliphatic dicarboxylic acid and/or its ester forming derivative).

As the aromatic dicarboxylic acid component, there may be primarily mentioned terephthalic acid component (terephthalic acid and/or its ester forming derivative), isophthalic acid component (isophthalic acid and/or its ester forming derivative).

In the present invention, it is preferred to use the aromatic dicarboxylic acid component in an amount of 50 to 80 mole % based on the total dicarboxylic acid component. Further, it is particularly preferred to use the terephthalic acid component and the isophthalic acid component in a molar ratio in the range of 30/70 to 70/30 in view of coating property to the support and solubility to water.

Specific aromatic dicarboxylic acid component may be mentioned, for example, an aromatic dicarboxylic acid such as phthalic acid, 2,5-dimethylterephthalic acid, 2,6-naphthalenedicarboxylic acid, 1,4-naphthalenedicarboxylic acid and biphenyldicarboxylic acid, and an ester forming derivative thereof.

As the alicyclic dicarboxylic acid and/or an ester forming derivative thereof, there may be used 1,4-cyclohexanedicarboxylic acid, 1,3-cyclohexanedicarboxylic acid, 1,2-cyclohexanedicarboxylic acid, 1,3-cyclopentanedicarboxylic acid and 4,4'-bicyclohexyldicarboxylic acid, or an ester forming derivative thereof. These material may be preferably used in an amount of 10 mole % or more based on the total dicarboxylic acid component in view of viscosity of the aqueous solution of the resin, and if it is too little, viscosity of the above becomes too high so that a problem arises in coating property.

Also, in the present invention, a linear aliphatic dicarboxylic acid and/or an ester forming derivative may be used in an amount of 15 mole % or less based on the total dicarboxylic acid component. As such a dicarboxylic acid component, there may be mentioned, for example, aliphatic dicarboxylic acid such as adipic acid, pimeric acid, suberic acid, azeraic acid and sebacic acid or an ester forming derivative thereof. If the amount of the above linear aliphatic dicarboxylic acid component becomes too much, blocking will likely be caused and with regard to adhesiveness, water resistance becomes poor.

In the present invention, from the viewpoints of the mechanical property of the polyester copolymer and adhesiveness of the polyester support, it is preferred to use ethylene glycol in an amount of 50 mole % or more based on the total glycol component. As the glycol component to be used in the present invention, there may be mentioned, in addition to ethylene glycol, 1,4-butanediol, neopentyl glycol, 1,4-cyclohexanedimethanol, diethylene glycol, triethylene glycol and polyethylene glycol, which may be used in combination.

As the method for polymerizing the polyester copolymer in the present invention, various methods which have conventionally been known can be used. For example, there may be mentioned the method in which transesterification reaction of dimethyl ester of dicarboxylic acid and glycol is carried out, and after removing methanol by distillation, gradually reducing the pressure and polycondensation is carried out under highly vacuum condition, the method in which esterification reaction of dicarboxylic acid and glycol is carried out and after removing water formed by distillation, gradually reducing the pressure and polycondensation is carried out under highly vacuum condition, or the method in which, when dimethyl ester of dicarboxylic acid and dicarboxylic acid are used as starting materials in combination, transesterification reaction of dimethyl ester of dicarboxylic acid and glycol is carried out, then esterification reaction is carried out by adding dicarboxylic acid, and thereafter polycondensation reaction is carried out under highly vacuum condition. As a catalyst for the transesterification reaction, there may be used those known in the art such as manganese acetate, calcium acetate, zinc acetate and others, and as a catalyst for the polycondensation reaction, there may be also used those known in the art such as antimony trioxide, germanium oxide, dibutyl tin oxide, titanium tetrabutoxide and others. Also, as a stabilizer, a phosphor compound such as trimethyl phosphate and triphenyl phosphate, and a hindered phenol type compound such as Irganox 1010 (trade name, produced by Ciba Geigy AG, pentaerythrityl tetrakis[3-(3,5-di-tert-4-hydroxyphenyl)propionate]) and others may be used. Provided that various conditions such as polymerization method, catalyst and stabilizer are not limited by the above examples.

An intrinsic viscosity of the polyester copolymer to be used in the present invention may be preferably in the range of 0.25 to 0.55 dl//g. Particularly preferred range of the intrinsic viscosity is 0.3 to 0.5 dl/g.

As the polymer having conductivity to be used in the present invention, there may be mentioned a polymer having at least one of a conductive group selected from the group consisting of a sulfonic acid group, a sulfate group, a quaternary ammonium group, a tertiary ammonium group and a carboxyl group, particularly preferably a polymer having a sulfonic acid group, a carboxyl group, a sulfate group and/or a salt thereof. The polymer should have the conductive group in an amount of 5% by weight based on one molecule of the polymer. In the polymer having conductivity, hydroxyl group, amino group, epoxy group, aziridine group, active metylene group, sulfinic acid group, aldehyde group, vinylsulfonic acid group and others may be contained.

The polymer to be used in the plastic film of the present invention has a number average molecular weight preferably of 500 to 5,000, and more preferably 700 to 4,000.

In the following, specific examples of the polymer having conductivity which can be used in the present invention are shown below but the present invention is not limited by these. In B-1 to B-48 which are to be used for the plastic resin film, $\overline{Mn}$ represents a number average molecular weight and the value is measured by using a gel permeation chromatography (GPC, HLC-8020, trade name, available from Toso Corporation) calculated on polystyrenesulfonate.

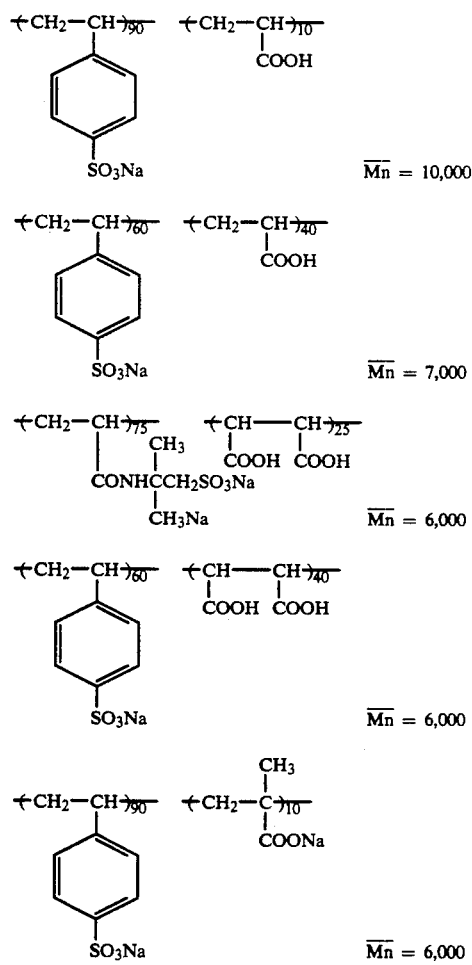

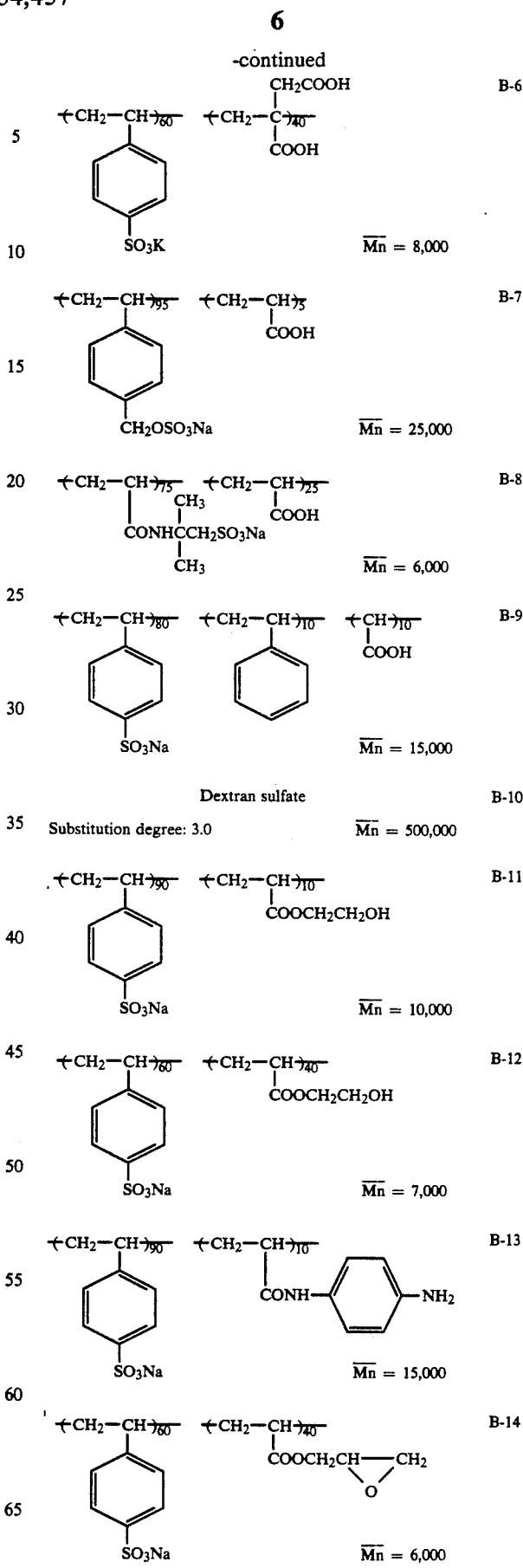

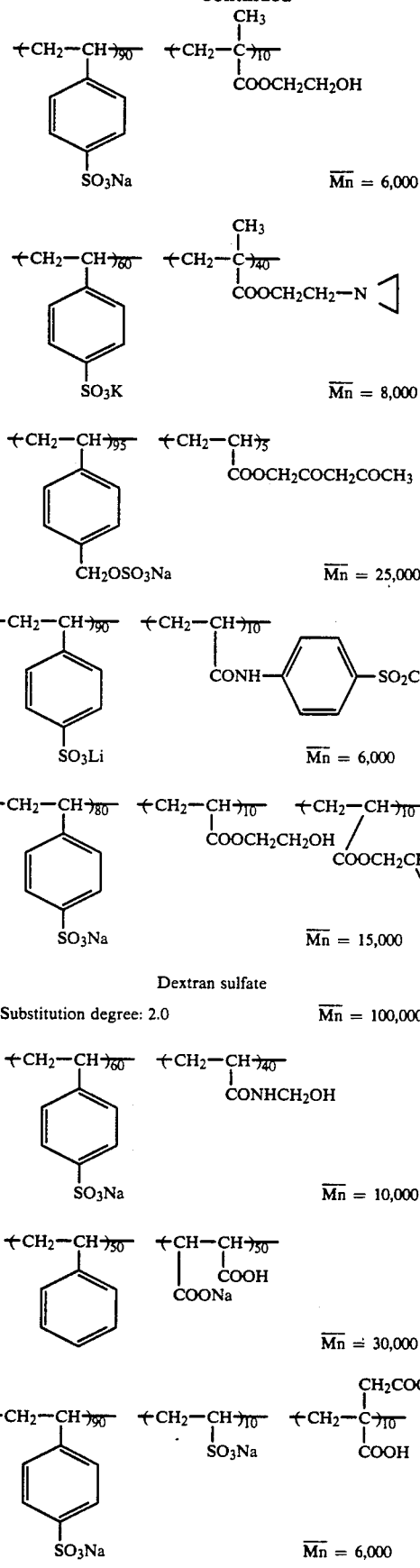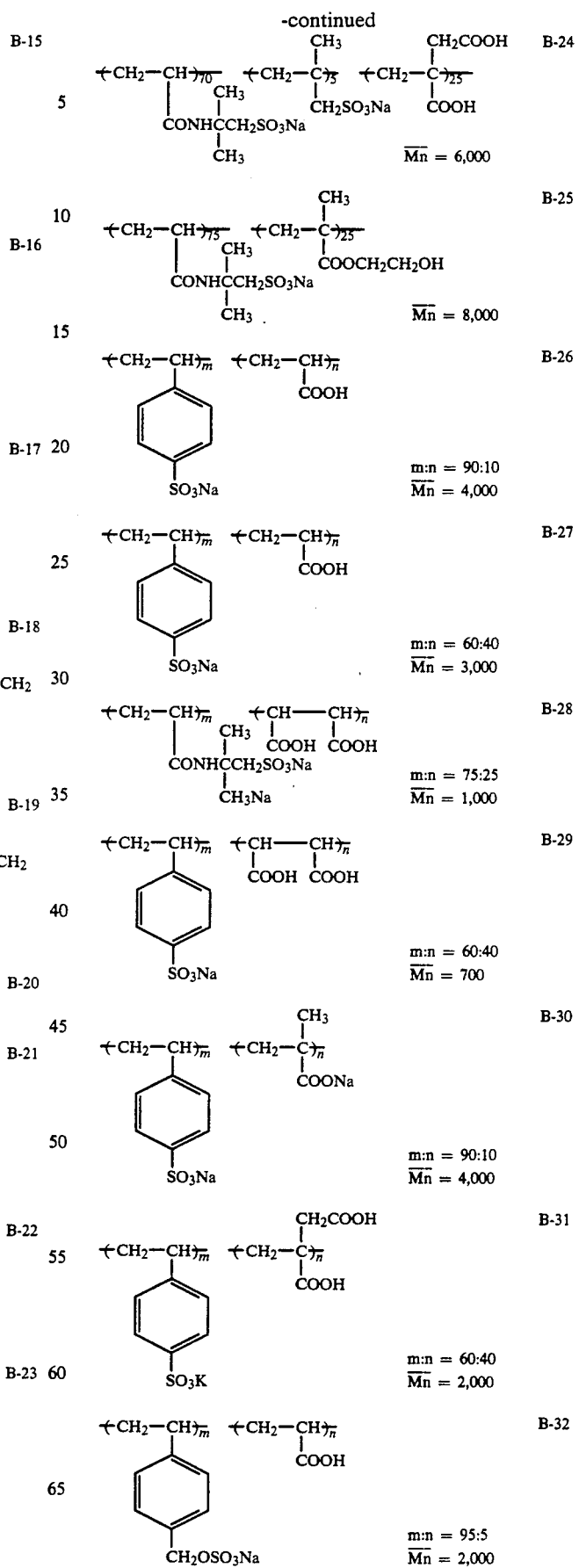

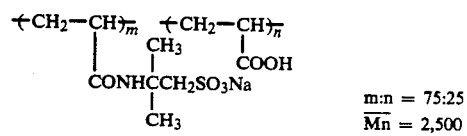
B-32
m:n = 75:25
$\overline{Mn}$ = 2,500

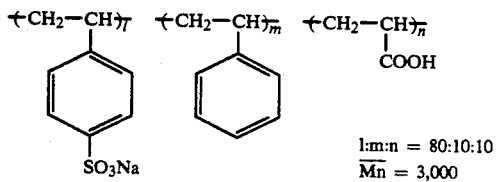
l:m:n = 80:10:10
$\overline{Mn}$ = 3,000

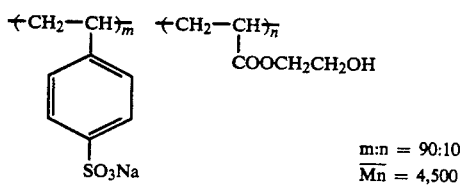
B-34
m:n = 90:10
$\overline{Mn}$ = 4,500

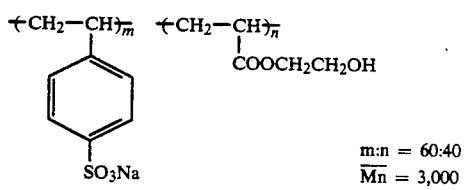
m:n = 60:40
$\overline{Mn}$ = 3,000

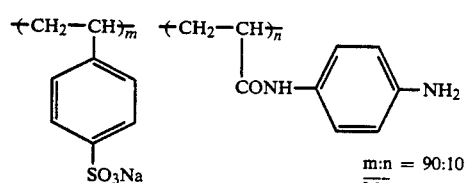
m:n = 90:10
$\overline{Mn}$ = 4,000

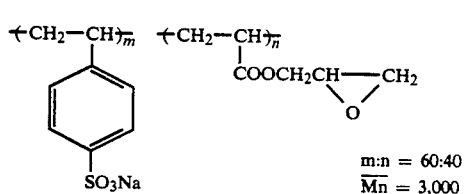
m:n = 60:40
$\overline{Mn}$ = 3,000

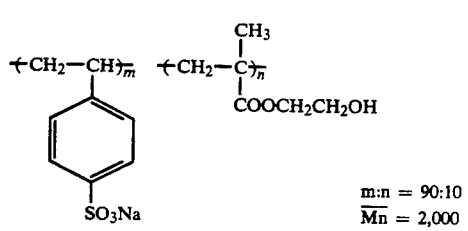
m:n = 90:10
$\overline{Mn}$ = 2,000

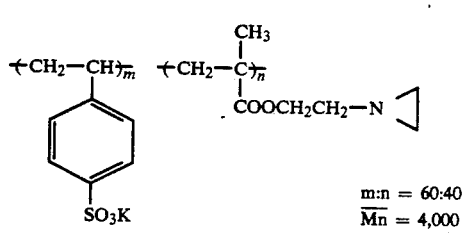
m:n = 60:40
$\overline{Mn}$ = 4,000

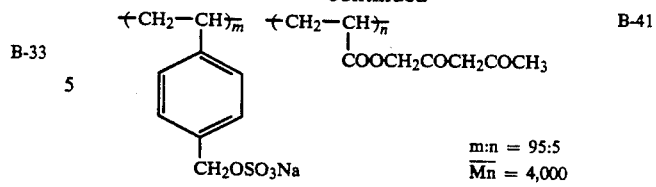
B-33
m:n = 95:5
$\overline{Mn}$ = 4,000

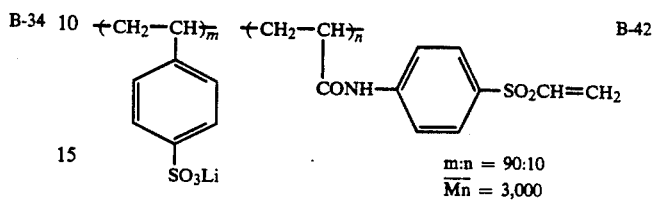
B-42
m:n = 90:10
$\overline{Mn}$ = 3,000

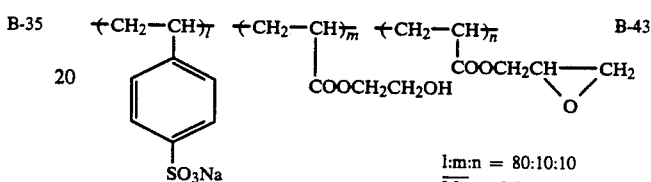
B-43
l:m:n = 80:10:10
$\overline{Mn}$ = 3,000

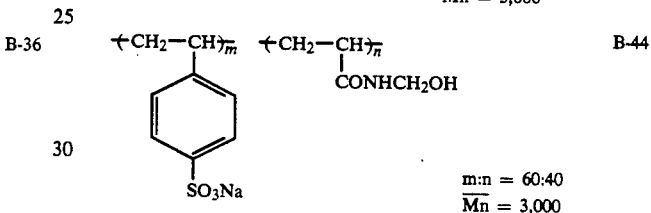
B-44
m:n = 60:40
$\overline{Mn}$ = 3,000

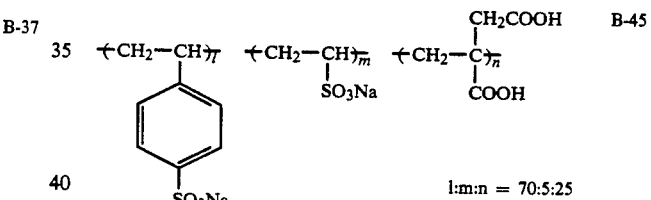
B-45
l:m:n = 70:5:25
$\overline{Mn}$ = 3,000

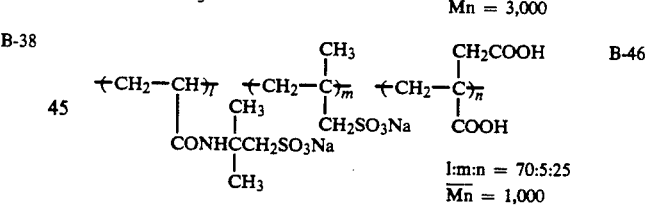
B-46
l:m:n = 70:5:25
$\overline{Mn}$ = 1,000

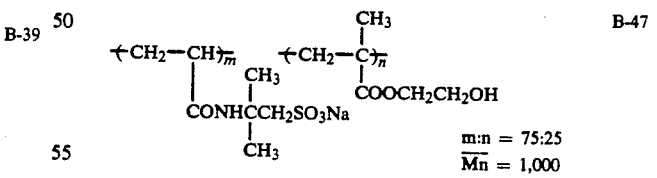
B-47
m:n = 75:25
$\overline{Mn}$ = 1,000

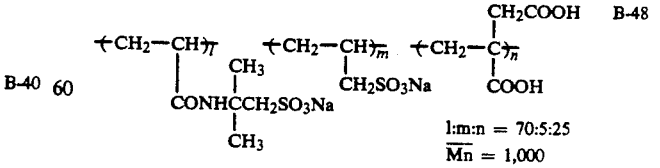
B-48
l:m:n = 70:5:25
$\overline{Mn}$ = 1,000

In the polymer having conductivity of the present invention, those having the following recurring unit are particularly preferred.

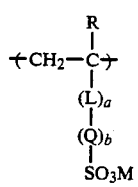

wherein R represents hydrogen atom, a halogen atom or an alkyl group having 1 to 6 carbon atoms; L represents each group of —COO— or —CONH—; Q represents an alkylene group having 1 to 6 carbon atoms; a and b each represent 0 or 1; and M represents hydrogen atom or a cation.

In the following, preferred examples of a recurring unit constituting the polymer having conductivity to be used in the present invention are shown below.

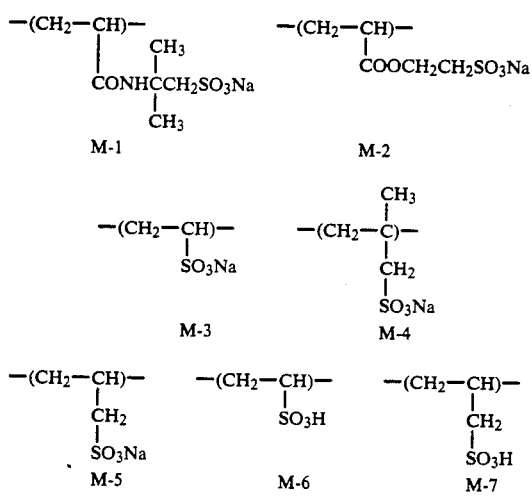

In the present invention, a cross-linking agent may be added to the polyester resin composition.

As the cross-linking agent to be used in the present invention, there may be preferably mentioned an epoxy compound, an aziridine compound, a blocked methylol compound, a blocked isocyanate compound and others, and among them, an epoxy compound and an aziridine compound are particularly preferred.

As the epoxy compound, it is not particularly limited so long as a compound having an epoxy group, but preferably those having 2 or more epoxy groups.

Representative water-soluble epoxy compounds are exemplified below.

| | |
|---|---|
| C - I | Sorbitol polyglycidyl ether |
| C - II | Sorbitan polyglycidyl ether |
| C - III | Polyglycerol polyglycidyl ether |
| C - IV | Diglycerol polyglycidyl ether |
| C - V | Glycerol polyglycidyl ether |
| C - VI | Ethylene glycol diglycidyl ether |
| C - VII | Polyethylene glycol diglycidyl ether |
| C - VIII | Propylene glycol diglycidyl ether |
| C - IX | Polypropylene glycol diglycidyl ether |

As commercially available products thereof, there may be mentioned DENACOL series (trade name, available from Nagase Kasei Kogyo K.K.) such as DENACOL EX-614B, EX-651A, EX-512, EX-521, EX-421, EX-313, EX-830, EX-841, EX-861, EX-91!, EX-920 (all trade names) and others, but the present invention is not limited by these.

Also, the above epoxy compounds may be used in combination of two or more.

Also, as the aziridine compound, those having two or more functional groups are preferred, and particularly preferably those having two or three functional groups and having a molecular weight or 1,000 or less.

Representative aziridine compounds are exemplified below.

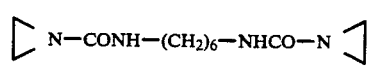

C-X

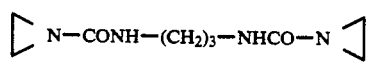

C-XI

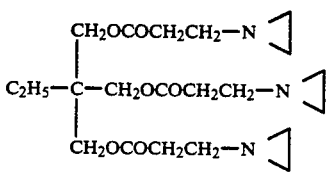

C-XII

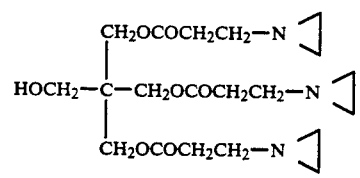

C-XIII

The above polyester resin composition preferably contains the above polyester copolymer, the polymer having conductivity and, if necessary, the cross-linking agent in an amount of the polyester copolymer: the polymer having conductivity: the cross-linking agent=(50 to 90% by weight): (30 to 9% by weight): (20 to 0% by weight).

To the (subbing layer) coating solution containing the above polyester resin (composition), a matte agent may be added, and further a water-soluble or water-dispersible polymer other than the polyester copolymer and the polymer having conductivity of the present invention may be added in an amount which does not impair the effect of the present invention.

The plastic film support to be used in the present invention may include those comprising a linear saturated polyester synthesized from an aromatic dibasic acid or its ester forming derivative and a diol or its ester forming derivative. Specific examples of such a polyester may include polyethylene terephthalate, polyethylene isophthalate and polybutylene terephthalate, and further their copolymers or those obtained by blending a little amount of the other resin thereto. A plastic film support in which a white pigment such as titanium oxide and barium sulfate is kneaded may be also mentioned.

Also, the plastic film of the present invention is preferably obtained by coating the coating solution containing the polyester resin (composition) according to the present invention on at least one surface of the plastic film support, drying and then stretching to at least one direction, and heat set to complete orientation and crystallization.

For coating the subbing layer coating solution to the plastic film support, it is, of course, possible to use the usual coating method, i.e. the method in which the subbing layer coating solution is coated on the biaxially oriented and heat-set plastic film support separately from the preparation process of said support, but the method requires separate process so that it is disadvantageous in cost. According to this viewpoint, it is preferred to use the method in which coating of the subbing layer coating solution is carried out in the course of the plastic film support preparation processes. It is particularly preferred to coat the solution on at least one surface of the plastic film support at any time before completion of orientation and crystallization during the processes as mentioned above. As one example of a method, the non-oriented film obtained by cooling the plastic melt extruded into a film through a die on a cooling drum is preheated, then stretched in the machine direction, and thereafter a subbing coating solution is applied thereon, and after drying, further preheated and stretched in the transverse direction, followed by heat set. Also, before coating of the subbing coating solution, a surface treatment such as corona discharging, glow discharging, etc. also may be performed.

In the present invention, the plastic film support before completion of orientation and crystallization means, for example, a non-oriented film prepared by melting a polyester polymer under heating to a film state, a uniaxially oriented film in which the non-oriented film is stretched to either one direction of longitudinal or transverse, or further a biaxially oriented film in which a film is biaxially stretched to longitudinal and transverse directions and stretched again to either one direction of longitudinal or transverse but before completion of orientation and crystallization.

The above longitudinal and transverse stretchings are each usually carried out with a magnification of 2.0 to 5.0-fold.

Also, a concentration of the above subbing layer coating solution is usually 15% by weight or less, preferably 10% by weight or less. An amount to be coated is preferably 1 to 20 g, more preferably 5 to 15 g in terms of weight of the coated solution per m² of the film.

As the coating method, conventionally known various methods may be applied to. For example, there may be applied the roll coat method, gravure roll method, spray coat method, air knife coat method, bar coat method, impregnating method and curtain coat method singly or in combination of these.

The thus coated plastic film such as a polyester film before completion of orientation and crystallization can be led to the procedures such as stretching and heat set after drying. The plastic film having the subbing layer thus formed on a support shows good adhesiveness to a hydrophilic colloid such as polyvinyl alcohol and gelatin, and good water resistance.

In the present invention, various films can be prepared by providing at least one hydrophilic colloid layer on the above subbing layer. For example, there may be mentioned a light-sensitive photographic material in which at least one silver halide emulsion layer is provided to the support on or over the subbing layer containing the polyester resin (composition) according to the present invention. Also, it is possible to provide a layer containing a binder such as a magnetic layer in place of the hydrophilic colloid layer.

As the hydrophilic colloid layer to be used in the above hydrophilic colloid layer, there may be used a protein such as gelatin, albumin and casein; a cellulose derivative such as hydroxyethyl cellulose, carboxymethyl cellulose and cellulose sulfate; a saccharide derivative such as sodium arginate and starch derivatives; and various kinds of synthetic hydrophilic polymer substances such as homo- or copolymer of polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole, but gelatin is preferably used. As the gelatin, in addition to a lime-treated gelatin, there may be used an acid-treated gelatin, or an oxygen-treated gelatin as described in "Bulletin Society Science Photography Japan", No. 16, p. 30 (1966), and further a hydrolyzate of gelatin or enzyme decomposed product thereof as well as a gelatin derivative and a graft polymer of gelatin and other polymer.

In the light-sensitive photographic material of the present invention, as the silver halide emulsion to be used in the at least one of the silver halide emulsion layer to be provided on or over the subbing layer as mentioned above, various usual silver halide emulsions may be optionally used. Said emulsion can be chemically sensitized according to the conventional method, and optically sensitized to a desired wavelength region by using a sensitizing dye.

Also, to the silver halide emulsion, an antifoggant, a stabilizer and a hardener may be added. As a binder of said emulsion, the hydrophilic colloid as mentioned above may be used and gelatin is advantageously used.

Film strength of the silver halide emulsion layer and other hydrophilic colloid layer can be enhanced by using a hardener. Such a hardener may include each hardener of an aldehyde type, aziridine type, isoxazole type, epoxy type, vinylsulfone type, acryloyl type, carbodiimide type, triazine type, polymer type, maleimide type, acetylene type and methanesulfonate type ones singly or in combination of two or more. Also, there may be contained a plasticizer, a latex which is a dispersion of a water-insoluble or hardly soluble synthetic polymer, a coupler, a coating aid, an antistatic agent, and further a formalin scavenger, a fluorescent brightener, a matte agent, a lubricant, an image stabilizer, a surfactant, a color fog preventive, a development accelerator, a development retardant or a bleach accelerator.

In the light-sensitive photographic material of the present invention, as the hydrophilic colloid layer other than the above silver halide emulsion layer, there may be mentioned auxiliary layers such as a protective layer, a filter layer, a back coating layer, an anti-halation layer, an anti-irradiation layer and an intermediate layer.

The present invention can be applied to various light-sensitive photographic material such as a light-sensitive X-ray material, light-sensitive printing material, light-sensitive material for photography and light-sensitive material for appreciation.

The plastic film of the present invention has the following effects.

(1) Since the polyester resin composition or copolymer can be used completely in aqueous system, there is no problem in working atmosphere such as toxicity and non-inflammability as well as environmental pollution so that facilities can be simplified as compared with those of using organic solvent.

(2) The plastic film or laminate to which the subbing layer containing the polyester resin composition to be used in the present invention is laminated is transparent and excellent in antistatic property and adhesiveness to the hydrophilic colloid layer and also shows adhesiveness with excellent water resistance.

(3) The polyester resin composition to be used in the present invention shows suitable viscosity as an aqueous solution so that it demonstrates particularly excellent effect in coating thereof to the plastic film support before completion of orientation and crystallization.

EXAMPLES

In the following, the present invention will be described in more detail by referring to Examples.

Measurements of the resulting polyester copolymer, polyester resin composition and polyester film support, each having a subbing layer were carried out and evaluations were carried out according to the following standard.

(1) Intrinsic viscosity: Measured in a mixed solution of phenol/1,1,2,2-tetrachloroethane=60/40 (weight ratio) at 20° C.

(2) Viscosity of the coating solution: Respective subbing layer coating solutions prepared were measured at 20° C.

(3) Coating property: Respective subbing layer coating solutions prepared were each coated on a uniaxially oriented polyethylene terephthalate support by using a wire bar with a predetermined coating thickness. Coated state at that time was evaluated by observation with eyes. Evaluation standards are as shown below.

○ Uniformly coated without unevenness.

Δ A little coating unevenness occurred.

X Uniform coating could not be done.

(4) Adhesiveness to a support: Polyethylene terephthalate having an intrinsic viscosity of 0.65 dl/g was melt extruded from a T-die at 280° C. to a shape of a film, electrostatically applied and quenched on a cooling drum at about 30° C. to obtain a non-oriented film (thickness: 1000 μm). This film was preheated to 75° C., longitudinally stretched (3-fold), and then corona discharged and surface treated. On said film (support) surface was coated a subbing layer coating solution, and the coated product was dried and preheated in a tenter, then stretched to transverse direction (3-fold) at 100° C., and further subjected to heat-set at 220° C. and cooled to obtain a subbing treated biaxially oriented polyethylene terephthalate film having a thickness of 0.3 g/m² (in terms of a polymer).

The subbing layer surface of the polyethylene terephthalate film was cut with a razor at an angle of 45°, a cellophane tape was adhered thereto and abruptly peel off whereby peel off area of the subbing layer was evaluated by five ranks.

(5) Adhesiveness to gelatin: On a polyethylene terephthalate film provided thereon a subbing layer which was obtained in the same manner as in (4) was coated a gelatin layer (solution) containing a hardener, the coated material was dried and hardened. Then, cut at an angle of 45° was made as in above (4), a cellophane tape was adhered thereto and abruptly peel off, and peel off area of the gelatin layer was evaluated by five ranks.

(6) Water resistance of adhesion: A film obtained in the same manner as in above (5) was dipped in an aqueous potassium hydroxide solution having a pH of 10.2 at 35° C. for 15 seconds, then the surface was cut with a nib or a pen point and scrubbed said portion strongly whereby peel off area of the gelatin layer was evaluated by five ranks.

Standard of five ranks evaluation showing adhesiveness and water resistance of adhesion is as follows.

1: Adhesion strength is extremely weak and completely peel off.

2: Peel off 50% or more.

3: 10 to 50% peel off.

4: Adhesion strength is relatively strong and only less than 10% peel off.

5: Adhesion strength is extremely weak and peel off not occurred.

If the evaluation is rank 4 or more, it can be deemed to be practically sufficient adhesion.

(7) Surface specific resistance: Surface specific resistance of the film obtained in the same manner as in above (4) was measured by using Teraohm meter VE-30 (trade name, manufactured by Kawaguchi Denki Co.) under the conditions of the applied voltage of 100 V, at 23° C. under the relative humidity (RH) of 55%.

(8) Transparency: Transparency of the film obtained in the same manner as in above (4) was obtained by measuring Haze using TURBIDIMETER MODEL T-2600DA (trade name, manufactured by Tokyo Denshoku Co.).

EXAMPLE 1

A mixture comprising 38.74 parts by weight of dimethyl terephthalate, 31.95 parts by weight of dimethyl isophthalate, 10.34 parts by weight of dimetyl 5-sulfoisophthalate sodium salt, 54.48 parts by weight of ethylene glycol, 0.073 part by weight of calcium acetate monohydrate and 0.024 part by weight of manganese acetate tetrahydrate was subjected to interesterification reaction under nitrogen atmosphere at 170° to 220° C. while removing methanol. Then, to the mixture were added 0.05 part by weight of trimethyl phosphate, and as polycondensation catalysts, 0.04 part by weight of antimony trioxide and 17.17 parts by weight of 1,4-cyclohexanedicarboxylic acid at a reaction temperature of 220° to 235° C., and substantially the theoretical amount of water was removed to effect esterification reaction. Thereafter, a pressure of the reaction system was reduced to 0.2 mmHg and the temperature of the same was raised to 280° C.. Provided that the polycondensation reaction was carried out for 2 hours to obtain a polyester copolymer (A).

The resulting polyester copolymer (A) was analyzed to have an intrinsic viscosity of 0.45 dl/g. Said polyester copolymer was stirred in hot water of 95° C. for 3 hours to obtain a 15% by weight aqueous solution.

By using the aqueous solution of the polyester copolymer (A) and the polymer (B-3) having conductivity as exemplified above, an aqueous solution for a subbing layer coating solution was prepared by mixing 85% by weight of (A) and 5% by weight of (B-3) based on the total weight of (A) and (B-3) with the total weight of (A) and (B-3) in the aqueous solution of 8% by weight.

This subbing layer coating solution was coated on a longitudinally stretched polyethylene terephthalate film support with corona discharging treatment, to prepare biaxially oriented polyethylene terephthalate film having a subbing layer with a dry weight of 0.3 g/m².

On the film having said subbing layer was laminated gelatin by the conventional method to prepare a film. With respect to them, evaluations such as adhesiveness and others were carried out.

The results are shown in Table 1.

EXAMPLES 2 AND 3

By using the aqueous solution of the polyester copolymer (A) and the polymer (B-3) having conductivity used in Example 1, and an epoxy compound (C-1) shown below, subbing layer coating solutions were prepared in the same manner as in Example 1 with the ratios shown in Table 1 and biaxially oriented polyethylene terephthalate films having a subbing layer and films to each of which gelatin is laminated were prepared.

EXAMPLE 7

In the same manner as in Example 2 except for replacing the epoxy compound (C-1) with the exemplified aziridine compound (C-XII), a biaxially oriented polyethylene terephthalate film having a subbing layer and a film to which gelatin is laminated was prepared.

COMPARATIVE EXAMPLES 1 AND 2

In the same manner as in Example 1 except for not using either of the polyester copolymer (A) or the poly-

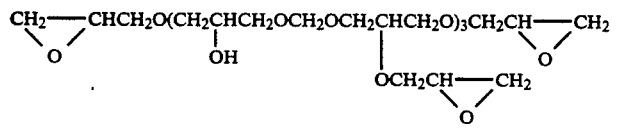
Epoxy compound (C-1)

EXAMPLE 4

In the same manner as in Example 2 except for replacing the polymer (B-3) having conductivity with that of mer (B) having conductivity and changing to those shown in Table 1, a biaxially oriented polyethylene terephthalate film having a subbing layer and a film to which gelatin is laminated was prepared.

TABLE 1

| | | | | Example | | | | | Comparative example | |
|---|---|---|---|---|---|---|---|---|---|---|
| Item | | 1 | 2 | 3 | 4 | 5 | 6 | 7 | 1 | 2 |
| Copolyester % by weight | | 85 | 81 | 55 | 90 | 81 | 81 | 81 | 100 | — |
| Polymer having conductivity | Kind | B-3 | B-3 | B-3 | B-24 | B-4 | B-15 | B-3 | — | B-3 |
| | % by weight | 15 | 15 | 25 | 9 | 15 | 15 | 15 | — | 100 |
| Cross-linking agent | Kind | — | C-1 | C-1 | C-1 | C-1 | C-2 | C-XII | — | — |
| | % by weight | — | 4 | 10 | 1 | 4 | 4 | 4 | — | — |
| Coating solution viscosity (CP) | | 3.2 | 3.8 | 4.5 | 2.7 | 3.4 | 4.1 | 4.0 | 5.1 | 3.9 |
| Coating property | | ○ | ○ | ○ | ○ | ○ | ○ | ○ | ○ | Δ |
| Intrinsic viscosity (dl/g) | | 0.45 | 0.45 | 0.45 | 0.45 | 0.45 | 0.45 | 0.45 | 0.45 | — |
| Adhesiveness to support | | 5 | 5 | 4 | 5 | 5 | 5 | 4 | 5 | 1 |
| Adhesiveness to gelatin | | 4 | 5 | 5 | 4 | 5 | 4 | 5 | 5 | 1 |
| Water resistance of adhesion | | 4 | 4 | 5 | 4 | 4 | 4 | 4 | 5 | 1 |
| Surface specific resistance (Ω) | | $1.4 \times 10^9$ | $2.4 \times 10^9$ | $5.2 \times 10^9$ | $4.0 \times 10^9$ | $3.6 \times 10^9$ | $4.5 \times 10^9$ | $5.5 \times 10^9$ | $2.0 \times 10^{14}$ | $5.4 \times 10^8$ |
| Transparency (%) | | 1.4 | 1.5 | 1.8 | 1.3 | 1.6 | 1.5 | 1.5 | 1.4 | 1.5 |

(B-24) with the ratio shown in Table 1, whereby a biaxially oriented polyethylene terephthalate film having a subbing layer and a film to which gelatin is laminated was prepared.

EXAMPLE 5

In the same manner as in Example 2 except for replacing the polymer (B-3) having conductivity with that of (B-4), a biaxially oriented polyethylene terephthalate film having a subbing layer and a film to which gelatin is laminated was prepared.

EXAMPLE 6

In the same manner as in Example 2 except for replacing the polymer (B-3) having conductivity with that of (B-15) and replacing the epoxy compound (C-1) with that of (C-2) shown below, a biaxially oriented polyethylene terephthalate film having a subbing layer and a film to which gelatin is laminated was prepared.

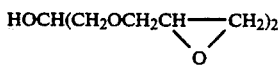
Epoxy compound (C-2)

EXAMPLE 8

On a biaxially oriented polyethylene terephthalate film having a subbing layer obtained by coating the subbing layer coating solution obtained by the completely same method as in Example 1 was coated a light-sensitive layer for X-ray photography by the conventional method to prepare a light-sensitive material sample. Film adhesion (adhesion between layers, hereinafter referred to as "raw film adhesion") at dried state before development processing, wet film adhesion during development processing and film adhesion at dried state after development processing (hereinafter referred to as "dried film adhesion") of the resulting light-sensitive material sample were measured according to the following methods, respectively, and evaluation of adhesiveness between layers were carried out. The results are shown in Table 2.

FILM ADHESION EVALUATION METHOD

Raw Film Adhesion and Dried Film Adhesion

On the surface of a hydrophilic colloid layer for photography before development processing or after processing, drying of which was completed, cut which reaches to the support was made with a blade of a razor at an angle of 45° to a lattice shape. To the lattice shape cut was adhered an adhesive tape (cellophane adhesive tape) and then said tape was abruptly peel off to the direction at an angle of about 45°. An area of the hydrophilic layer for photography which peel off with the tape was compared with an area in which the tape was adhered, and evaluation was carried out by the following five ranks.

| Evaluation | 5 | 4 | 3 | 2 | 1 |
|---|---|---|---|---|---|
| Peel off State | Completely None | 0-20% | 21-50% | 51-100% | 101% or more |

If the evaluation is rank 4 or more, it can be deemed to be practically sufficient adhesion.

Wet Film Adhesion

On the surface of a hydrophilic colloid layer for photography of a sample during various development processing, cut which reaches to the support was made with a sharp needle to a lattice shape. Thereafter, the surface of said layer at wet state was scrubbed strongly for 10 seconds. An area of the hydrophilic layer for photography which peel off was compared with an area in which the tape was adhered, and evaluation was carried out by the five ranks. Evaluation standards are the same as in the raw and dry film adhesion.

EXAMPLES 9 TO 14

In the same manner as in Example 7 except for changing the subbing layer coating solution containing a polyester resin to those as shown in Table 2, light-sensitive material samples were prepared as in Example 7, and the same evaluations as in Example 7 were carried out. These samples were made Examples 8 to 14.

The results are shown in Table 2.

ity as exemplified above, an aqueous solution for a subbing layer coating solution was prepared by mixing 85% by weight of (A) and 15% by weight of (B-28) based on the total weight of (A) and (B-28) with the total weight of (A) and (B-28) in the aqueous solution of 8% by weight.

This subbing layer coating solution was coated on a longitudinally stretched polyethylene terephthalate film support with corona discharging treatment, to prepare biaxially oriented polyethylene terephthalate film having a subbing layer with a dry weight of 0.5 g/m². Also, on the film having said subbing layer was laminated gelatin by the conventional method to prepare a film. With respect to them, evaluations such as adhesiveness and others were carried out.

The results are shown in Table 3.

EXAMPLES 16 AND 17

By using the aqueous solution of the polyester copolymer (A) and the polymer (B-28) having conductivity used in Example 15, and the epoxy compound (C-1) shown in Examples 2 and 3, subbing layer coating solutions were prepared in the same manner as in Example 15 with the ratios shown in Table 3 and biaxially oriented polyethylene terephthalate films having a subbing layer and films to each of which gelatin is laminated were prepared.

EXAMPLE 18

In the same manner as in Example 16 except for replacing the polymer (B-28) having conductivity with that of (B-46) with the ratio shown in Table 3, whereby a biaxially oriented polyethylene terephthalate film having a subbing layer and a film to which gelatin is laminated was prepared.

The resulting film was evaluated in the same manner as in Example 16. The results are shown in Table 3.

TABLE 2

| Example Item | Example | | | | | | |
|---|---|---|---|---|---|---|---|
| | 8 | 9 | 10 | 11 | 12 | 13 | 14 |
| Subbing layer coating solusolution | Same as in Example 1 | Same as in Example 2 | Same as in Example 3 | Same as in Example 4 | Same as in Example 5 | Same as in Example 6 | Same as in Example 7 |
| Raw film adhesion | 4 | 5 | 5 | 4 | 5 | 4 | 5 |
| Wet film adhesion | 4 | 4 | 5 | 4 | 4 | 4 | 4 |
| Dry film adhesion | 5 | 5 | 5 | 5 | 5 | 5 | 5 |

As clearly seen from Table 2, the light-sensitive material samples for X-ray photography having the subbing layer containing the polyester resin according to the present invention are excellent in all the raw film adhesion, wet film adhesion and dry film adhesion, particularly in wet film adhesion.

Such effects can be obtained not only in the light-sensitive material for X-ray photography but also various light-sensitive material for photography (light-sensitive material containing color emulsion, emulsion for printing material and others).

EXAMPLE 15

In the same manner as in Example 1, a polyester copolymer (A) was obtained.

The resulting polyester copolymer (A) was analyzed to have an intrinsic viscosity of 0.45 dl/g. Said polyester copolymer was stirred in hot water of 95° C. for 3 hours to obtain a 15% by weight aqueous solution.

By using the aqueous solution of the polyester copolymer (A) and the polymer (B-28) having conductiv-

EXAMPLE 19

In the same manner as in Example 16 except for replacing the polymer (B-28) having conductivity with that of (B-51), a biaxially oriented polyethylene terephthalate film having a subbing layer and a film to which gelatin is laminated was prepared.

The resulting film was evaluated in the same manner as in Example 16. The results are shown in Table 3.

EXAMPLE 20

In the same manner as in Example 16 except for replacing the polymer (B- 28) having conductivity with that of (B-9) and replacing the epoxy compound (C-1) with that of exemplary compound (C-XII) shown above, a biaxially oriented polyethylene terephthalate film having a subbing layer and a film to which gelatin is laminated was prepared.

The resulting film was evaluated in the same manner as in Example 16. The results are shown in Table 3.

EXAMPLE 21

In the same manner as in Example 16 except for replacing the polymer (B-28) having conductivity with that of (B-48) and replacing the epoxy compound (C-1) with that of exemplary compound (C-XII) shown above, a biaxially oriented polyethylene terephthalate film having a subbing layer and a film to which gelatin is laminated was prepared.

The resulting film was evaluated in the same manner as in Example 16. The results are shown in Table 3.

COMPARATIVE EXAMPLES 3 AND 4

In the same manner as in Example 15 except for not using either of the polyester copolymer (A) or the polymer (B-28) having conductivity and changing amounts thereof to those shown in Table 3, biaxially oriented polyethylene terephthalate films having a subbing layer and a film to which gelatin is laminated were prepared.

The resulting film was evaluated in the same manner as in Example 15. The results are shown in Table 3.

sample. Film adhesion (adhesion between layers, hereinafter referred to as "raw film adhesion") at dried state before development processing, wet film adhesion during development processing and film adhesion at dried state after development processing (hereinafter referred to as "dried film adhesion") of the resulting light-sensitive material sample were measured according to the methods described in Example 8, respectively, and evaluation of adhesiveness between layers were carried out. Further, evaluation of transparency was also carried out. The results are shown in Table 4.

EXAMPLES 23 TO 28

In the same manner as in Example 22 except for changing the subbing layer coating solution containing a polyester resin to those as shown in Table 4, light-sensitive material samples were prepared as in Example 22, and the same evaluations as in Example 22 were carried out. These samples were made Examples 23 to 28. The results are shown in Table 4.

TABLE 4

| Example Item | Example | | | | | | |
|---|---|---|---|---|---|---|---|
| | 22 | 23 | 24 | 25 | 26 | 27 | 28 |
| Subbing layer coating solu-solution | Same as in Example 15 | Same as in Example 16 | Same as in Example 17 | Same as in Example 18 | Same as in Example 19 | Same as in Example 20 | Same as in Example 21 |
| Raw film adhesion | 4 | 5 | 5 | 4 | 5 | 4 | 5 |
| Wet film adhesion | 4 | 4 | 5 | 4 | 4 | 4 | 5 |
| Dry film adhesion | 5 | 5 | 5 | 5 | 5 | 5 | 4 |
| Heise | 2.3 | 2.1 | 2.0 | 2.3 | 2.2 | 2.0 | 2.0 |

As clearly seen from Table 4, the light-sensitive mate-

TABLE 3

| Item | | Example | | | | | | | Comparative example | |
|---|---|---|---|---|---|---|---|---|---|---|
| | | 15 | 16 | 17 | 18 | 19 | 20 | 21 | 3 | 4 |
| Copolyester % by weight | | 85 | 81 | 55 | 90 | 81 | 81 | 81 | 100 | — |
| Polymer having conductivity | Kind | B - 28 | B - 28 | B - 28 | B - 46 | B - 46 | B - 49 | B - 48 | — | B - 28 |
| | % by weight | 15 | 15 | 25 | 9 | 15 | 15 | 15 | — | 100 |
| Cross-linking agent | Kind | — | C - 1 | C - 1 | C - 1 | C - 1 | C - 2 | C - XII | — | — |
| | % by weight | — | 4 | 10 | 1 | 4 | 4 | 4 | — | — |
| Coating solution viscosity (CP) | | 2.8 | 3.3 | 4.0 | 2.0 | 3.0 | 3.5 | 3.5 | 5.1 | 3.9 |
| Coating property | | ○ | ○ | ○ | ○ | ○ | ○ | ○ | ○ | Δ |
| Intrinsic viscosity (dl/g) | | 0.45 | 0.45 | 0.45 | 0.45 | 0.45 | 0.45 | 0.45 | 0.45 | — |
| Adhesiveness to support | | 5 | 5 | 4 | 5 | 5 | 5 | 4 | 5 | 1 |
| Adhesiveness to gelatin | | 4 | 5 | 5 | 4 | 5 | 4 | 5 | 5 | 1 |
| Water resistance of adhesion | | 4 | 4 | 5 | 4 | 4 | 4 | 4 | 5 | 1 |
| Surface specific resistance (Ω) | | $1.4 \times 10^9$ | $2.4 \times 10^9$ | $5.2 \times 10^9$ | $4.0 \times 10^9$ | $3.6 \times 10^9$ | $4.5 \times 10^9$ | $5.5 \times 10^9$ | $2.0 \times 10^{14}$ | $5.4 \times 10^8$ |
| Transparency (%) | | 1.4 | 1.5 | 1.8 | 1.3 | 1.6 | 1.5 | 1.5 | 1.4 | 1.5 |

As clearly seen from Table 3, the polyethylene terephthalate films using the polyester resin composition comprising the polyester copolymer and the polymer having number average molecular weight of 500 to 5000 and conductivity as a subbing layer according to the present invention are excellent in all the points of adhesiveness, water resistance of adhesion, antistatic property and transparency.

EXAMPLE 22

On a biaxially oriented polyethylene terephthalate film having a subbing layer obtained by coating the subbing layer coating solution obtained by the completely same method as in Example 15 was coated a light-sensitive layer for X-ray photography by the conventional method to prepare a light-sensitive material rial samples for X-ray photography having the subbing layer containing the polyester resin composition according to the present invention are excellent in all the raw film adhesion, wet film adhesion and dry film adhesion, particularly excellent in transparency and dry film adhesion.

Such effects can be obtained not only in the light-sensitive material for X-ray photography but also various light-sensitive material for photography (light-sensitive material containing color emulsion, emulsion for printing material and others).

We claim:

1. A film laminate comprising a plastic film support and a polyester resin composition layer laminated on the surface of the plastic film support, wherein the polyester resin composition layer comprising components of a polyester copolymer (A), a polymer (B) having a conductive group in an amount of at least 5% by weight based on one molecule of the polymer (B) and having a recurring unit represented by the following formula (I):

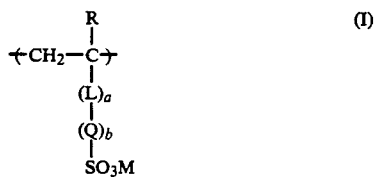

wherein R represents a hydrogen atom, a halogen atom or an alkyl group having 1 to 6 carbon atoms; L represents each group of —COO— or —CONH—; Q represents an alkylene group having 1 to 6 carbon atoms; a and b each represents 0 or 1; and M represents a hydrogen atom or a cation, and a cross-linking agent (C).

2. The film of claim 1 wherein the ratio of the polyester copolymer: the polymer having a conductive group: the cross-linking agent is 50 to 90% by weight: 30 to 9% by weight: 20 to 1% by weight.

3. The film of claim 1 wherein said polymer (B) has a number average molecular weight of 500 to 5,000.

4. The film laminate of claim 3, wherein the polymer (B) has a recurring unit selected from the group consisting of the formulae M-1 to M-7:

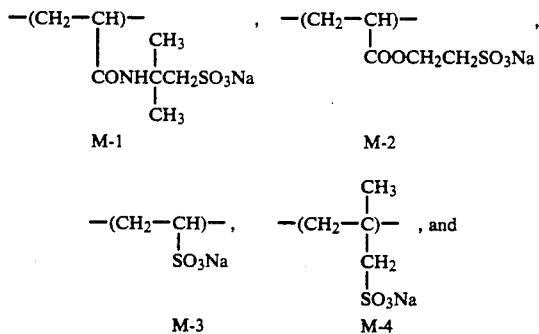

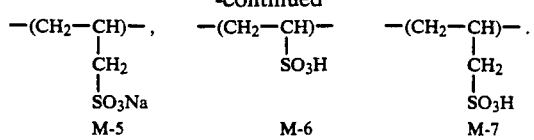

5. The film laminate of claim 1, wherein the polyester copolymer (A) is formed by reaction of a mixed dicarboxylic acid component containing 5 to 25 mole % of a dicarboxylic acid having a sulfonic acid salt component based on the total dicarboxylic acid component or its ester forming derivative, and a glycol component.

6. The film of claim 5 wherein said dicarboxylic acid having a sulfonic acid salt component is present in an amount of 6 to 10 mole %.

7. The film laminate of claim 5 further comprises a hydrophilic colloid layer.

8. The film laminate of claim 5 further comprises a silver halide emulsion layer.

9. The film laminate of claim 1, wherein the polyester copolymer (A) is contained in an amount of 50 to 95% by weight and the polymer (B) is 50 to 5% by weight based on the total weight of (A) and (B).

10. The film laminate of claim 1, wherein the cross-linking agent (C) is selected from the group consisting of an epoxy compound, and aziridine compound, a blocked methylol compound and a blocked isocyanate compound.

11. The film laminate of claim 10, wherein the cross-linking agent (C) is an epoxy compound.

12. The film laminate of claim 1, wherein the polyester copolymer (A) has an intrinsic viscosity in the range of 0.25 to 0.55 dl/g.

13. The film laminate of claim 1, wherein the conductive group is contained in the polymer (B) in an amount of 9 to 25% by weight.

14. The film laminate of claim 1, wherein the cross-linking agent (C) is contained in the polyester resin composition in an amount of 1 to 10% by weight.

15. The film laminate of claim 1, wherein the polymer (B) has a conductive group selected from the group consisting of a sulfonic acid group, a sulfate group, a quaternary ammonium group, a tertiary ammonium group and a carboxyl group.

16. The film laminate of claim 1, wherein the polymer (B) has a conductive group which is a sulfate group or a group selected from the group consisting of a sulfonic acid group, a carboxyl group and a salt of the above groups.

* * * * *